United States Patent

(12) United States Patent
Friend

(10) Patent No.: US 6,728,757 B1
(45) Date of Patent: Apr. 27, 2004

(54) SMART HTML ELECTRONIC MAIL

(75) Inventor: John L. Friend, Los Altos, CA (US)

(73) Assignee: America Online, Incorporated, Dulles, VA (US)

( * ) Notice: Subject to any disclaimer, the term of this patent is extended or adjusted under 35 U.S.C. 154(b) by 908 days.

(21) Appl. No.: 09/090,990

(22) Filed: Jun. 4, 1998

(51) Int. Cl.$^7$ .............................................. G06F 15/16
(52) U.S. Cl. ................................................ 709/206
(58) Field of Search ................................ 709/206, 207, 709/245, 246, 202, 203, 217, 219

(56) References Cited

U.S. PATENT DOCUMENTS

| | | | |
|---|---|---|---|
| 5,283,887 A | * 2/1994 | Zachery | 709/206 |
| 5,630,060 A | * 5/1997 | Tang et al. | 709/206 |
| 5,706,434 A | * 1/1998 | Kremen et al. | 709/206 |
| 5,826,062 A | * 10/1998 | Fake, Jr. et al. | 709/206 |
| 5,872,926 A | * 2/1999 | Levac et al. | 709/206 |
| 5,911,776 A | * 6/1999 | Guck | 709/217 |
| 6,094,684 A | * 7/2000 | Pallmann | 709/246 |

OTHER PUBLICATIONS

Berners–Lee, et al.; Request for Comments (RFC) 1866, "Hypertex Markup Language—2.0", Nov. 1995.*

* cited by examiner

*Primary Examiner*—Marc D. Thompson
(74) *Attorney, Agent, or Firm*—Glenn Patent Group; Michael A. Glenn

(57) ABSTRACT

The smart Hypertext Markup Language (HTML) electronic mail system utilizes an intelligent decision algorithm to decide if an addressee is HTML capable or if plain text is required. The user specifies if certain e-mail domains, newsgroups, and individual e-mail addresses are HTML-capable or require plain text e-mail or the invention will query directory servers such as Lightweight Directory Access Protocol (LDAP) servers as to the HTML capabilities of an e-mail client. The user composes an HTML e-mail document, indicating the addressees in the "to" field and selects the "send" command, the invention examines the document and, if the addressee is known to be HTML-capable, the document is transmitted as is. If the addressee is not known to be HTML-capable and if the document does not contain any HTML formatting that cannot be easily rendered in plain text, the invention automatically converts the document to plain text and transmits the document, thereby taking full advantage of the rich text formatting of HTML. If the document does contain any HTML features that are unique, the invention asks the user if he wants to send the document as is or have it converted over to plain text before sending, thereby providing a smart HTML e-mail system that automatically and intelligently converts and distributes the user's e-mail documents to both HTML-capable and plain text e-mail clients.

30 Claims, 5 Drawing Sheets

SMART HTML ELECTRONIC MAIL

BACKGROUND OF THE INVENTION

1. Technical Field

The invention relates to the creation of electronic mail to be transmitted across a computer network and Internet environment. More particularly, the invention relates to the intelligent formatting of electronic mail sent to computer network and Internet recipients of plain text and Hypertext Markup Language (HTML)-formatted electronic mail.

2. Description of the Prior Art

Electronic mail (e-mail) has evolved over the years, from the sending of simple ASCII text across computer networks to the inclusion of URL links and Java applets amidst formatted text. As a result, many e-mail standards are in use today. Two of the most common forms are plain text and HTML formatting. Plain text e-mail contains minimal text formatting and can represent structures such as bullet lists. There are many e-mail clients that can only receive plain text e-mail from the Internet or other e-mail clients or they cannot interpret HTML formatting.

HTML formatting adds powerful formatting features to a document, e.g. fonts, bold, italic, color, images, paragraph alignment, links, bulleted and numbered lists, and tables. HTML-capable e-mail clients understand both HTML and plain text formatting.

Referring to FIG. 1, a problem arises when an HTML-capable client 101 sends HTML-formatted e-mail to a plain text e-mail client 102. The plain text e-mail client 102 cannot understand the HTML-formatted document. The document will appear garbled, unreadable or will be blank when opened by the plain text e-mail client 102.

One approach to this problem is always to send two copies of the document. One copy has HTML formatting and the other copy has plain text formatting. The problem with this approach is that the memory demands on the recipient are much higher because the recipient must store two copies of the document each time. Additionally, the bandwidth requirements across the computer network are also higher because redundant messages are being sent.

Another approach is always to send plain text e-mail messages to all recipients. The drawback to this approach is that the rich formatting features of HTML are lost when plain text messages are sent to HTML-capable e-mail clients.

If the user wants to send HTML messages to HTML-capable clients, he must switch between the plain text document editor and the HTML editor. Using this approach to send e-mail to both plain text and HTML clients requires the user to create two copies of the same document. The user must enter the plain text editor and create one copy of the document and then enter the HTML editor to create an HTML-formatted copy of the same document. This effort is not only bothersome and time-consuming, but it also requires the user to remember which recipients are HTML-capable each time a message is sent.

It would be advantageous to provide an intelligent e-mail system that is capable of sending HTML-formatted e-mail to clients that are HTML-mapable and plain text e-mail to those clients that are not HTML-capable. It would further be advantageous to provide an intelligent e-mail system that allows the user to create one document and have said document converted from HTML-formatting to plain text automatically, thereby taking advantage of the rich HTML formatting features.

SUMMARY OF THE INVENTION

The invention provides a smart Hypertext Markup Language (HTML) electronic mail system. The invention uses an intelligent, automatic, and convenient HTML e-mail system that allows the user to send both HTML-formatted and plain text e-mail from one application.

The user specifies if certain e-mail domains, newsgroups, and individual e-mail addresses are HTML-capable or require plain text e-mail. Another option allows the invention to query directory servers such as Lightweight Directory Access Protocol (LDAP) servers as to the HTML capabilities of an e-mail client.

The user composes an HTML e-mail document, indicating the addressees in the "to" field. When the user selects the "send" command, the invention utilizes an intelligent decision algorithm to decide if an addressee is HTML capable or if plain text is required. It examines the document and, if the addressee is known to be HTML-capable, the document is transmitted as is.

If the addressee is not known to be HTML-capable and if the document does not contain any HTML formatting that cannot be easily rendered in plain text, the invention automatically converts the document to plain text and transmits the document, thereby sending the simpler and more commonly supported plain text form of the message without materially altering the display of the message or having to ask the user what to do. If the document does contain any HTML features that cannot be easily rendered in plain text, the invention asks the user if he wants to send the document as is or have it converted over to plain text before sending. The invention automatically and intelligently converts and distributes the user's e-mail documents to both HTML-capable and plain text e-mail clients.

DETAILED DESCRIPTION OF THE INVENTION

The invention provides a smart HTML e-mail system that automatically and intelligently converts and distributes the user's e-mail documents to both HTML-capable and plain text e-mail clients.

Figure 2:
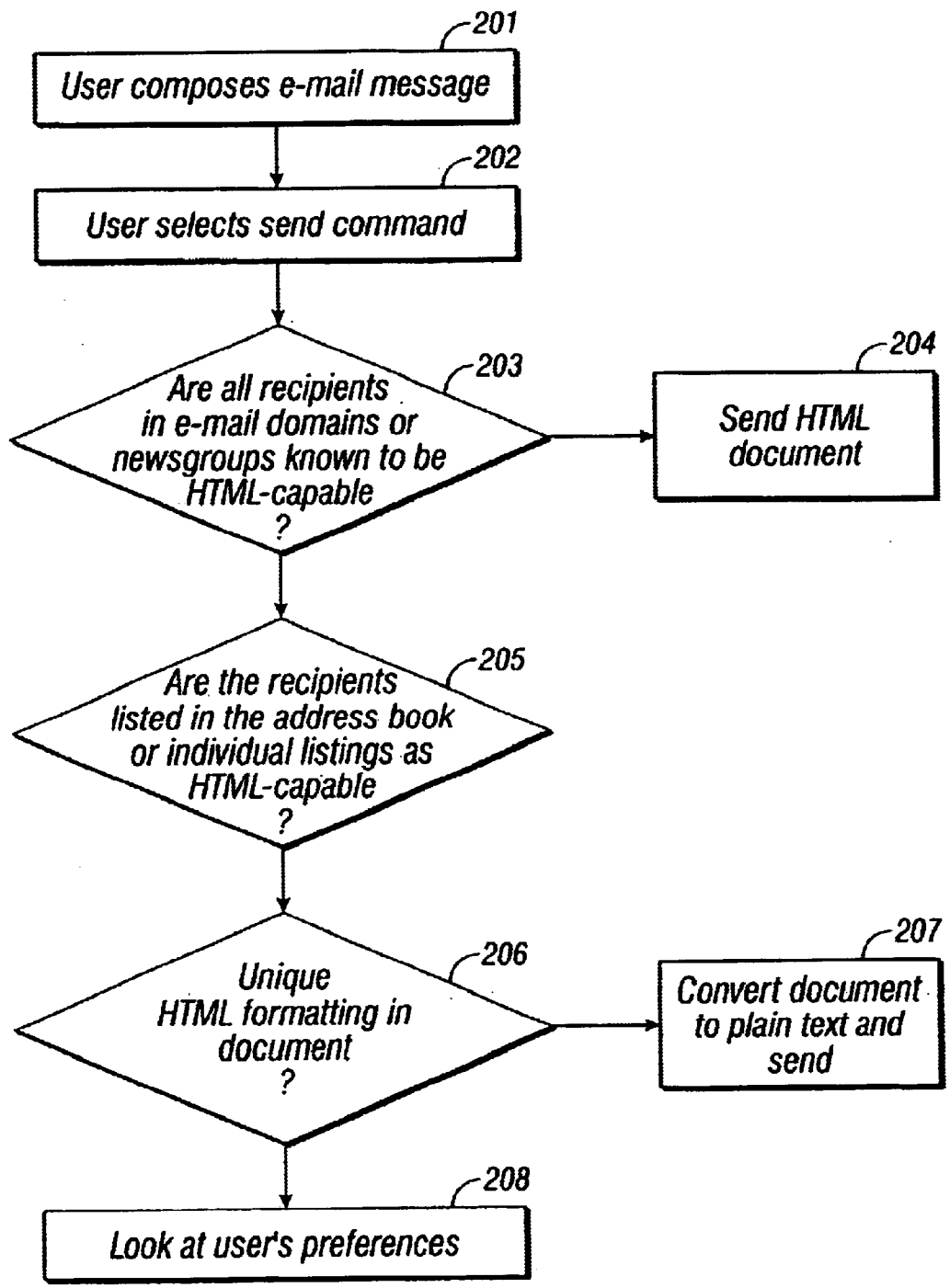
FIG. 2 is a block schematic diagram showing a decision flowchart of a preferred embodiment of the invention.

Referring to FIG. 2, in a preferred embodiment, the user composes an E-mail message using an Hypertext Markup Language (HTML) document editor such as Netscape's Composer 201. This message may contain HTML encoding. When the user has completed his document, the user selects the send command to send the document to the person(s) or newsgroup(s) that the user has designated as the addressee(s) 202. The invention checks the e-mail domain or newsgroup hierarchies to see if all of the recipients are known to be HTML-capable 203. If all of the listed recipients are known to be HTML-capable, then the document is sent as HTML 204. Otherwise, the remaining recipients that are not in known HTML-capable e-mail domains or newsgroup hierarchies are checked in the individual listings and in the address book to see if they are listed as HTML-capable 205. If the remaining recipients are listed as HTML-capable, then the document is sent as HTML 204. Otherwise, the document itself is then examined to see if it contains any HTML formatting that are not easily converted to plain text 206 (e.g. bolding, italics, color, fonts, and images). If the document does not contain any unique HTML formatting, then the document is converted to plain text and sent 207. Otherwise, the user's preferences are followed for this situation 208.

Figure 1:
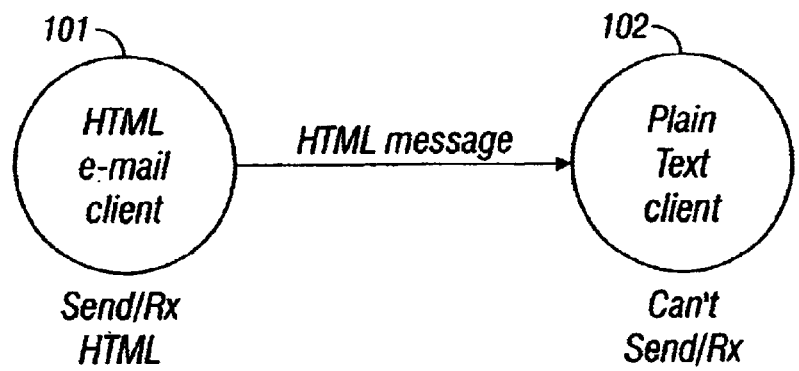
FIG. 1 is a block schematic diagram of the prior art incompatibility between HTML e-mail clients and plain text e-mail clients.
Figure 3:
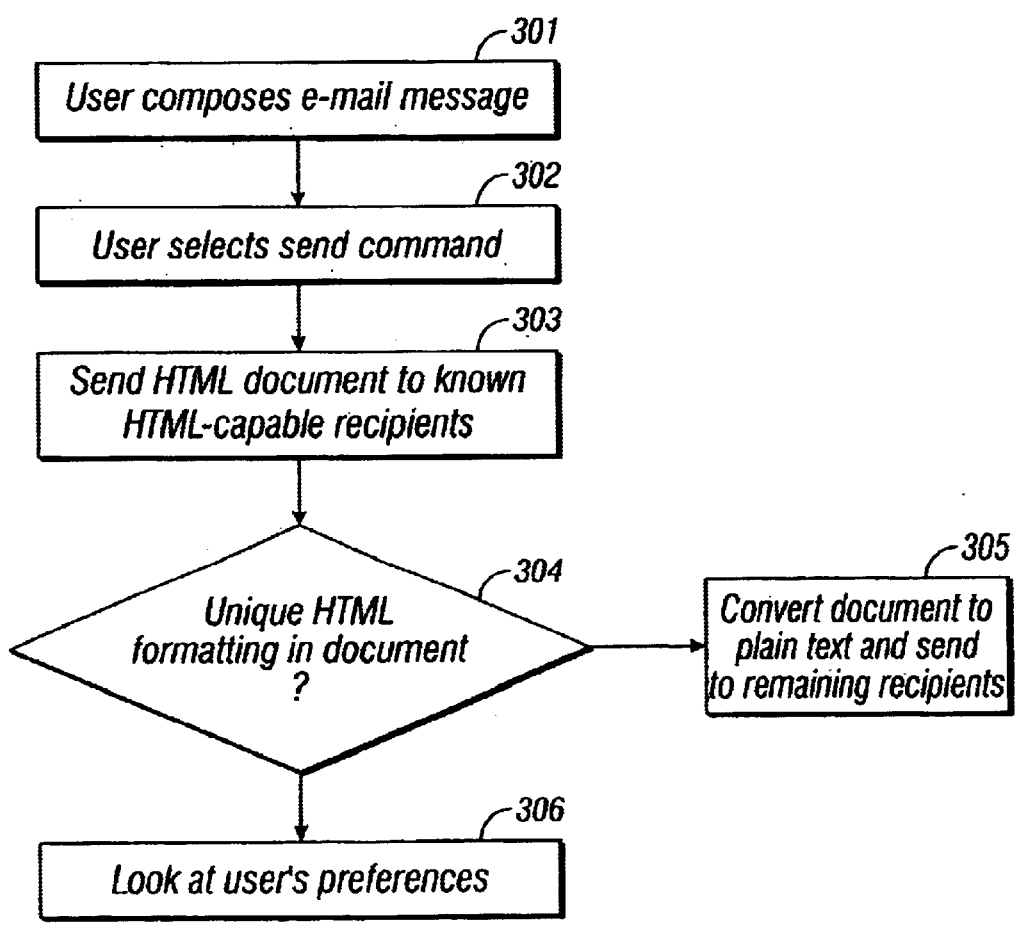
FIG. 3 is a block schematic diagram showing a decision flowchart of a preferred embodiment of the invention including an intelligent traversal of the recipient list.

With respect to FIG. 3, in another equally preferred embodiment, the user composes an e-mail message using an HTML document editor such as Netscape's Composer 301. This message may contain HTML encoding. When the user has completed his document, the user selects the send command to send the document to the person(s) or newsgroup(s) that the user has designated as the addressee(s) 302. The invention will check each of the listed recipients, any of the listed recipients that are known to be HTML-capable will be sent the document in HTML format 303. Otherwise, the document itself is then examined to see if it contains any HTML formatting that are not easily converted to plain text 304 (e.g. bolding, italics, color, fonts, and images). If the document does not contain any unique HTML formatting, then the document is converted to plain text and sent to the remaining recipients 305. Otherwise, the user's preferences are followed for this situation 306.

Figure 4:
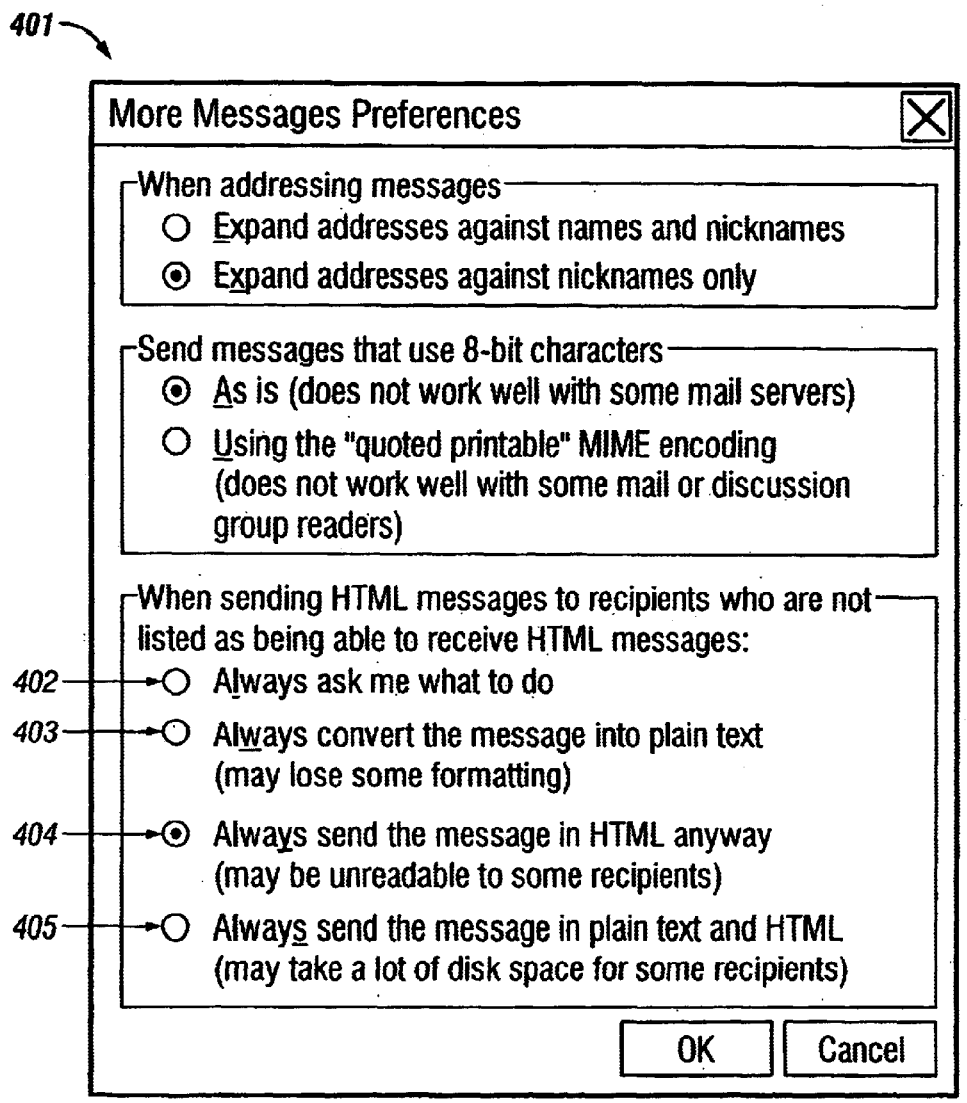
FIG. 4 is a diagram of a window containing the user's preferences for sending HTML messages according to the invention.
Figure 5:
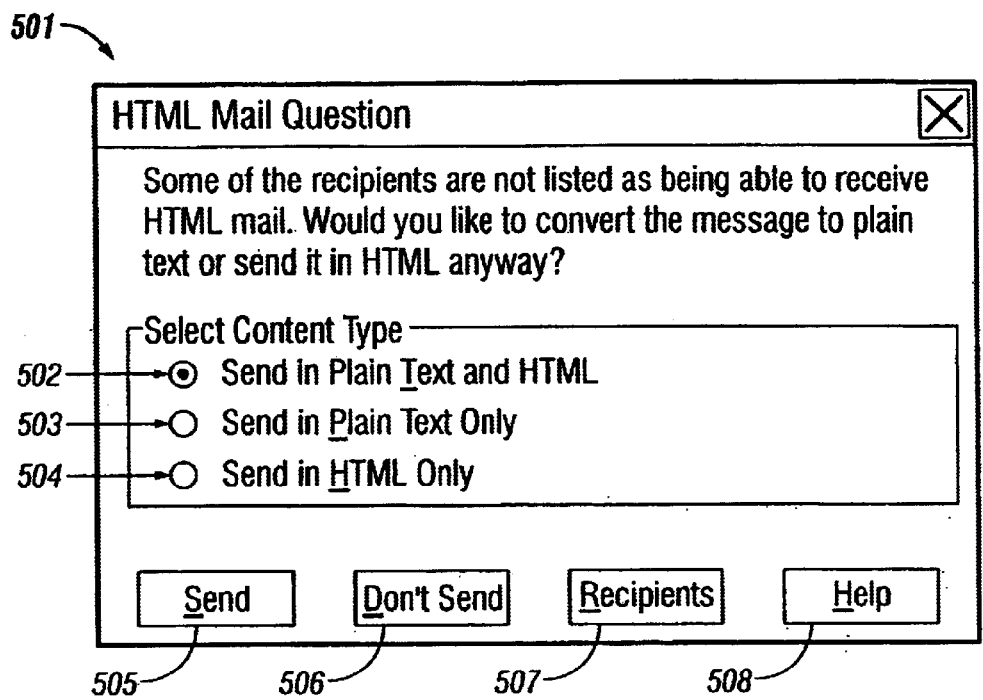
FIG. 5 is a diagram of a pop-up window containing user actions for sending HTML messages according to the invention.

Referring to FIGS. 4 and 5, the user's preferences are set by the user via a selection palette 401. The selection palette 401 contains a list of actions that the invention performs when sending HTML messages to recipients that are not listed as being able to receive HTML messages. The first option is to always ask what to do 402. The user is presented with an action selection palette 501. The action selection palette 501 allows the user to send the message as plain text and HTML 502 (which sends one copy of the message in plain text and one copy in HTML format), sent as plain text only 503 or sent in HTML only 504. The user selects the command to send the message 505 or not to send the message and exit 506. A list of the recipients 507 and their HTML capabilities that the user has designated can also be displayed for the user to examine or update.

The next option is to always convert the messages into plain text 403. The user is not notified when the conversion occurs and some formatting may be lost in the conversion. The third option always sends the message in HTML format 404 which may be unreadable to some recipients. Finally, the option to always send the message in plain text and HTML 405 sends two copies of the message to the recipient: one copy in plain text and one copy in HTML format. This option consumes more disk space on the recipient's machine.

Figure 6:
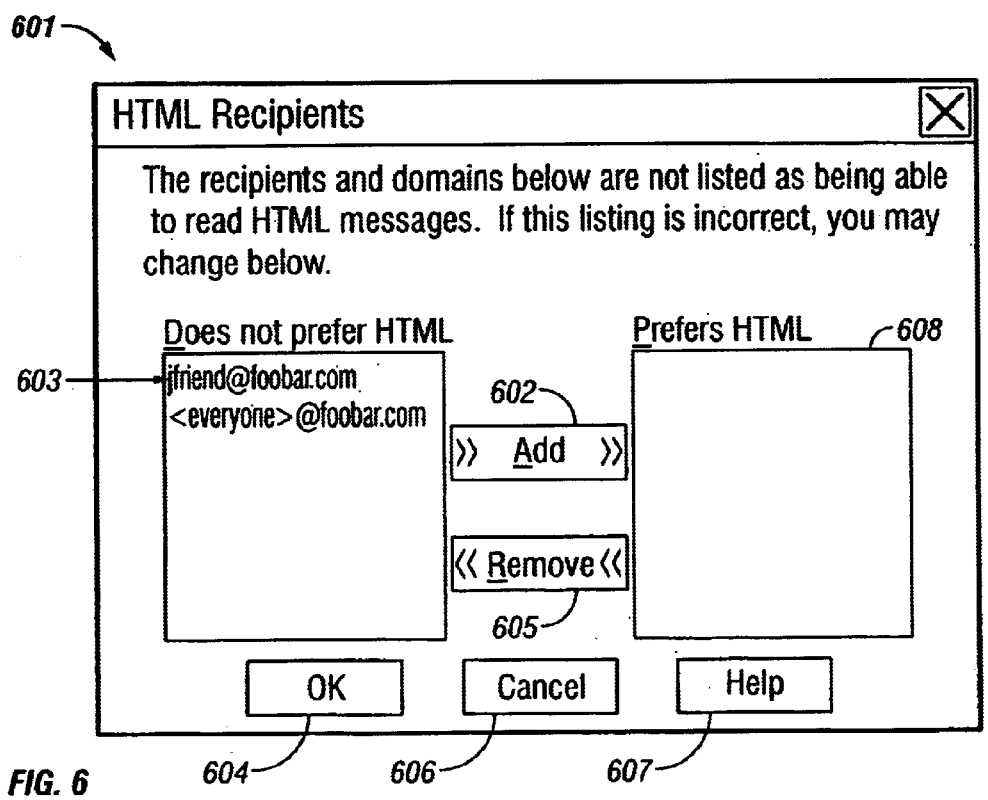
FIG. 6 is a diagram of a window containing a user-defined list of e-mail recipients that do and do not prefer HTML-formatted e-mail according to the invention.

With respect to FIG. 6, the user specifies the capabilities of individual recipients and domains in a recipient window 601. Individual e-mail addresses, newsgroups, and e-mail domain names are entered into either the "Does not prefer HTML" area 603 or the "Prefers HTML" area 608. Entries are easily switched between the two areas by clicking on the "Add" button 602 to move entries from the "Does not prefer HTML" area 603 to the "Prefers HTML" area 608 or by clicking on the "Remove" button 605 to move entries from the "Prefers HTML" area 608 to the "Does not prefer HTML" area 603. The updated entries are saved by clicking on the "OK" button 604 or changes are ignored by clicking on the "Cancel" button 606.

Figure 7:
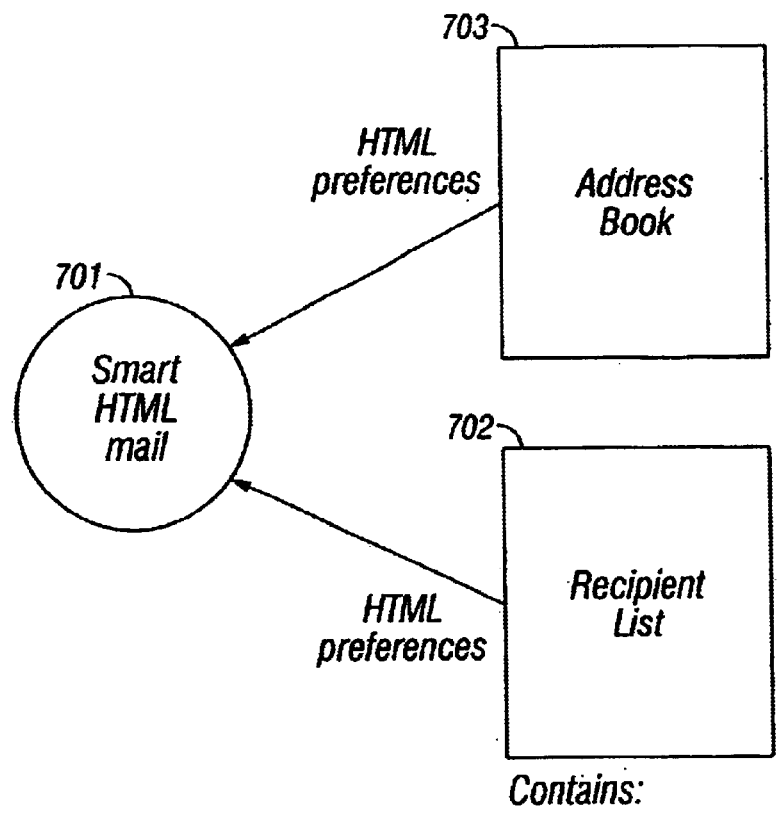
FIG. 7 is a block schematic diagram showing the invention's interaction with the recipient list and address book according to the invention.

Referring to FIG. 7, the Smart HTML mail module 701 refers to the Recipient List 702 to obtain the HTML preferences for newsgroups, e-mail domains, and individual e-mail addresses. The Address Book 703 is also referred to by the Smart HTML mail module 701 for the HTML preferences of newsgroups, e-mail domains, and individual e-mail addresses. Entries into the Address Book 703 can be made when an e-mail is received containing an electronic business card such as Versit's vCard. The user is given the option to enter the electronic business card into the Address Book 703. The user also manually enters information into the Address Book 703.

Figure 8:
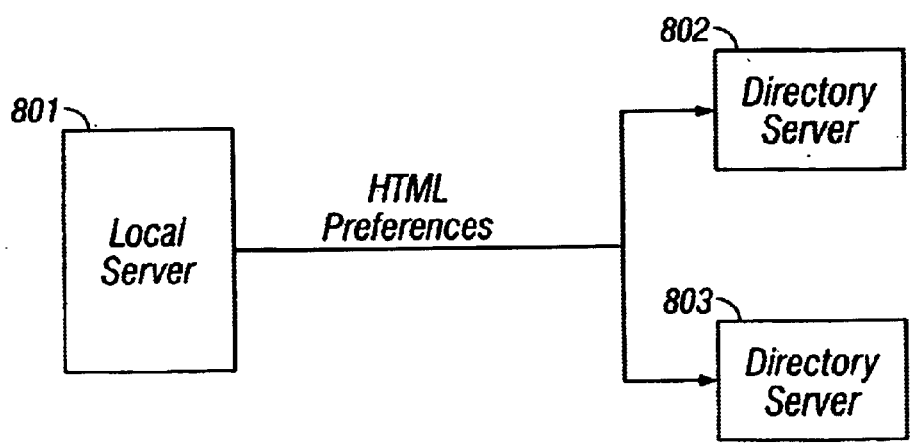
FIG. 8 is a block schematic diagram showing the invention querying directory servers across a computer network according to the invention.

With respect to FIG. 8, in a further extension of the invention's capabilities, when the HTML preferences for designated e-mail recipients are not known, the local server 801 queries directory servers 802, 803 (e.g. Lightweight Directory Access Protocol (LDAP) servers) for the HTML preferences of those servers. This information can then be distributed among all of the e-mail clients on the local server 801, thereby providing a fully automatic recipient HTML preference lookup function.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A process for sending Hypertext Markup Language (HTML) formatted electronic mail across a computer network, comprising the steps of:

creating an HTML document;

checking the designated recipients for HTML capability; and sending said document to said designated recipients in accordance with said recipient's HTML capability.

2. The process of claim 1, wherein said checking step checks if all of said designated recipients are known to be HTML-capable and if all of said designated recipients are HTML-capable, sending said document in HTML format.

3. The process of claim 1, wherein said checking step checks if any of said designated recipients are known to be HTML-capable and if any of said designated recipients are known not to be HTML-capable, examining the contents of said document for any HTML formatting that is not easily converted to plain text, if none exist, then converting said document into plain text before sending said document.

4. The process of claim 1, wherein said checking step checks if any of said designated recipients are known to be HTML-capable and if any of said designated recipients are known not to be HTML-capable, examining the contents of said document for any HTML formatting that is not easily converted to plain text, if any exist, then performing the action that is preset in the user's preferences.

5. The process of claim 4, wherein said action is sending both an HTML formatted document and a plain text document to said designated recipients.

6. The process of claim 4, wherein said action is sending said document in HTML format to said designated recipients.

7. The process of claim 4, wherein said action is converting said document to plain text format and sending said document to said designated recipients.

8. The process of claim 1, wherein said checking step checks if each of said designated recipients are known to be HTML-capable and sending said document in HTML format to each of said designated recipients that are HTML-capable.

9. The process of claim 1, wherein said checking step checks if any of said designated recipients are known not to be HTML-capable, examining the contents of said document for any HTML formatting that is not easily converted to plain text, if none exist, then converting said document into plain text, sending said document to each of said designated recipients that are not HTML-capable.

10. The process of claim 1, wherein said checking step checks if any of said designated recipients are known not to be HTML-capable, examining the contents of said document for any HTML formatting that is not easily converted to plain text, if any exist, then performing the action that is preset in the user's preferences.

11. The process of claim 10, wherein said action is sending both an HTML formatted document and a plain text document to each of said designated recipients that are not HTML-capable.

12. The process of claim 10, wherein said action is sending said document in HTML format to each of said designated recipients that are not HTML-capable.

13. The process of claim 10, wherein said action is converting said document to plain text format and sending said document to each of said designated recipients that are not HTML-capable.

14. The process of claim 1, further comprising the step of:
querying a directory server across said computer network for the HTML capability of each of said designated recipients whose HTML capabilities are unknown.

15. The process of claim 1, further comprising the step of:
recording the HTML capabilities of recipients in an address book or recipient list.

16. An apparatus for sending Hypertext Markup Language (HTML) formatted electronic mail across a computer network, comprising:
means for creating an HTML document;
means for checking the designated recipients for HTML capability; and
means for sending said document to said designated recipients in accordance with said recipient's HTML capability.

17. The apparatus of claim 16, wherein said checking means checks if all of said designated recipients are known to be HTML-capable and if all of said designated recipients are HTML-capable, sends said document in HTML format.

18. The apparatus of claim 16, wherein said checking step checks if any of said designated recipients are known to be HTML-capable and if any of said designated recipients are known not to be HTML-capable, examining the contents of said document for any HTML formatting that is not easily converted to plain text, if none exist, then converting said document into plain text before sending said document.

19. The apparatus of claim 16, wherein said checking means checks if any of said designated recipients are known to be HTML-capable and if any of said designated recipients are known not to be HTML-capable, examines the contents of said document for any HTML formatting that is not easily converted to plain text, if any exist, then performs the action that is preset in the user's preferences.

20. The apparatus of claim 19, wherein said action is sending both an HTML formatted document and a plain text document to said designated recipients.

21. The apparatus of claim 19, wherein said action is sending said document in HTML format to said designated recipients.

22. The apparatus of claim 19, wherein said action is converting said document to plain text format and sending said document to said designated recipients.

23. The apparatus of claim 16, wherein said checking means checks if each of said designated recipients are known to be HTML-capable and sends said document in HTML format to each of said designated recipients that are HTML-capable.

24. The apparatus of claim 16, wherein said checking means checks if any of said designated recipients are known not to be HTML-capable, examines the contents of said document for any HTML formatting that is not easily converted to plain text, if none exist, then converts said document into plain text, sends said document to each of said designated recipients that are not HTML-capable.

25. The apparatus of claim 16, wherein said checking means checks if any of said designated recipients are known not to be HTML-capable, examines the contents of said document for any HTML formatting that is not easily converted to plain text, if any exists, then performs the action that is preset in the user's preferences.

26. The apparatus of claim 25, wherein said action is sending both an HTML formatted document and a plain text document to each of said designated recipients that are not HTML-capable.

27. The apparatus of claim 25, wherein said action is sending said document in HTML format to each of said designated recipients that are not HTML-capable.

28. The apparatus of claim 25, wherein said action is converting said document to plain text format and sending said document to each of said designated recipients that are not HTML-capable.

29. The apparatus of claim 16, further comprising:
means for querying a directory server across said computer network for the HTML capability of each of said designated recipients whose HTML capabilities are unknown.

30. The apparatus of claim 16, further comprising:
means for recording the HTML capabilities of recipients in an address book or recipient list.

* * * * *